United States Patent

Medeiros et al.

(10) Patent No.: US 12,430,249 B1
(45) Date of Patent: Sep. 30, 2025

(54) LOCATION-BASED GLOBAL CACHE TIERING

(71) Applicant: Dell Products L.P., Round Rock, TX (US)

(72) Inventors: Earl Medeiros, Fall River, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/619,925

(22) Filed: Mar. 28, 2024

(51) Int. Cl.
*G06F 12/08* (2016.01)
*G06F 12/0802* (2016.01)

(52) U.S. Cl.
CPC ............... *G06F 12/0802* (2013.01)

(58) Field of Classification Search
CPC .................................... G06F 12/0802
USPC ....................................... 711/118
See application file for complete search history.

(56) References Cited

U.S. PATENT DOCUMENTS

| | | | |
|---|---|---|---|
| 11,074,113 B1* | 7/2021 | Ivester | G06F 12/0815 |
| 2021/0034499 A1* | 2/2021 | Hershkovitz | G06F 11/3466 |

* cited by examiner

*Primary Examiner* — Hua J Song
(74) *Attorney, Agent, or Firm* — Daly, Crowley, Mofford & Durkee, LLP

(57) ABSTRACT

A method for use in a storage processor, comprising: generating or updating a cache metadata table that identifies a plurality of cache slots, for each of the plurality of cache slots, the cache metadata table including a different respective location identifier that indicates a location for that cache slot; receiving an I/O request that is associated with a logical block address; allocating a given one of the plurality of cache slots to the logical block address based on the respective location identifier that corresponds to the given cache slot; and executing the I/O request by using the given cache slot, wherein using the given cache slot includes identifying a memory address that is associated with the cache slot and executing at least one direct memory access (DMA) command based on the memory address.

17 Claims, 11 Drawing Sheets

LOCATION-BASED GLOBAL CACHE TIERING

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage processor, comprising: generating or updating a cache metadata table that identifies a plurality of cache slots, for each of the plurality of cache slots, the cache metadata table including a different respective location identifier that indicates a location for that cache slot; receiving an I/O request that is associated with a logical block address; allocating a given one of the plurality of cache slots to the logical block address based on the respective location identifier that corresponds to the given cache slot; and executing the I/O request by using the given cache slot, wherein using the given cache slot includes identifying a memory address that is associated with the cache slot and executing at least one direct memory access (DMA) command based on the memory address, wherein the cache metadata table includes a global memory cache table for a storage system of which the storage processor is part, and at least some of the plurality of cache slots are resident in random access memory modules of other storage processors that are part of the storage system, and wherein identified memory address is a global memory address belonging to a memory namespace that encompasses multiple storage processors in the storage system.

According to aspects of the disclosure, a computing device is provided, comprising: a memory; and at least one processor that is operatively coupled to the memory, the at least one processor being configured to perform the operations of: generating or updating a cache metadata table that identifies a plurality of cache slots, for each of the plurality of cache slots, the cache metadata table including a different respective location identifier that indicates a location for that cache slot; receiving an I/O request that is associated with a logical block address; allocating a given one of the plurality of cache slots to the logical block address based on the respective location identifier that corresponds to the given cache slot; and executing the I/O request by using the given cache slot, wherein using the given cache slot includes identifying a memory address that is associated with the cache slot and executing at least one direct memory access (DMA) command based on the memory address, wherein the cache metadata table includes a global memory cache table for a storage system of which the computing device is part, and at least some of the plurality of cache slots are resident in random access memory modules of other computing devices that are part of the storage system, and wherein identified memory address is a global memory address belonging to a memory namespace that encompasses multiple computing devices in the storage system.

According to aspects of the disclosure, a non-transitory computer-readable medium is provided storing one or more processor-executable instructions, which, when executed by at least one processor of a computing device, causes the computing device to perform the operations of: generating or updating a cache metadata table that identifies a plurality of cache slots, for each of the plurality of cache slots, the cache metadata table including a different respective location identifier that indicates a location for that cache slot; receiving an I/O request that is associated with a logical block address; allocating a given one of the plurality of cache slots to the logical block address based on the respective location identifier that corresponds to the given cache slot; and executing the I/O request by using the given cache slot, wherein using the given cache slot includes identifying a memory address that is associated with the cache slot and executing at least one direct memory access (DMA) command based on the memory address, wherein the cache metadata table includes a global memory cache table for a storage system of which the computing device is part, and at least some of the plurality of cache slots are resident in random access memory modules of other computing devices that are part of the storage system, and wherein identified memory address is a global memory address belonging to a memory namespace that encompasses multiple computing devices in the storage system.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1A:
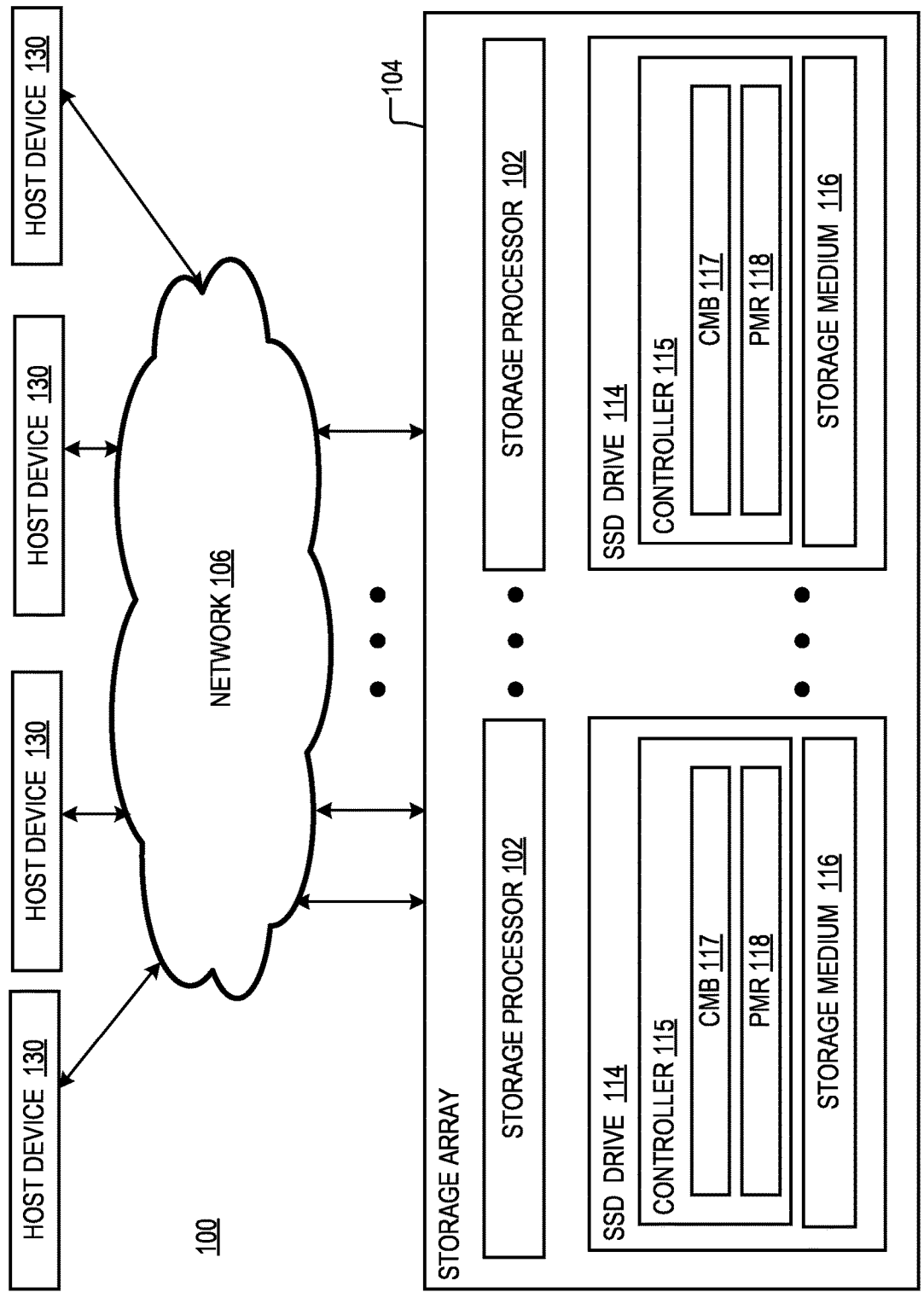
FIG. 1A is a diagram of an example of a system, according to aspects of the disclosure.

FIG. 1A is a diagram of an example of a system 100, according to aspects of the disclosure. As illustrated, the system 100 may include a storage array 104, a communications network 106, and a plurality of host devices 130. The communications network 106 may include one or more of a fibre channel (FC) network, the Internet, a local area network (LAN), a wide area network (WAN), and/or any other suitable type of network. The storage array 104 may include a storage system, such as DELL/EMC Powermax™, DELL PowerStore™, and/or any other suitable type of storage system. The storage array 104 may include a plurality of storage devices 114 and a plurality of storage processors 102. Each of the storage processors 102 may be configured to receive I/O requests from host devices 130 and execute the received I/O requests by reading and/or writing data to storage devices 114. Each of the host devices 130 may include a desktop computer, a laptop, a smartphone, an internet-of-things (IoT) device, and/or any other suitable type of computing device.

According to the present example, each of storage devices 114 is a solid-state drive (SSD). In some implementations, each of the storage devices 114 may be a non-volatile memory express (NVME) device that is connected to the storage processors 102 via a Peripheral Component Interconnect Express (PCIe) connection. Each of the storage devices 114 may include a respective controller 115 and respective storage medium 116. The controller 115 of each storage device 114 may include processing circuitry that is configured to perform various tasks, such as the retrieval and storage of data on medium 116, wear leveling, error handling, garbage collection, as well as other functions. The medium 116 may include an array of NAND memory cells and/or any other suitable type of storage medium. Each controller 115 may include a respective controller memory buffer (CMB) 117 and a respective persistent memory region (PMR) 118. The PMR 118 may be an area of persistent memory that can be read or written with standard PCIe memory reads and writes. The CMB 117 may be an area of memory that can be read or written to with standard PCIe memory reads and writes. In some implementations, the difference between CMB 117 and PMR 118 may be that the contents of CMB 117 does not persist across power cycles and resets, whereas the contents of PMR 118 persist across such cycles. In some implementations, CMB 117 may be implemented by using volatile memory (e.g., Dynamic Random Access Memory (DRAM)), whereas PMR 118 may be implemented by using non-volatile memory (e.g., NAND memory, etc.). Additionally or alternatively, PMR 118 may be implemented by using power-protected DRAM. In some implementations, CMB 117 may have a lower latency than PMR 118.

In some implementations, any of the storage devices 114 may be internal to one of the storage processors 102 and coupled to the storage processor via an M.2 slot that is provided on the motherboard of that storage processor. Additionally, or alternatively, in some implementations, any of the storage devices 114 may be part of a disk array enclosure (DAE) and coupled to each of the storage processors 102 via a respective InfiniBand adapter of that storage processor. It will be understood that the present disclosure is not limited to any specific method for connecting storage devices 114 to storage processors 102.

In some implementations, the storage processors 102 and the storage devices 114 may be located in geographically disparate locations. For example, the storage processors 102 may be distributed across multiple, cities, countries, or continents. Similarly, the storage devices 114 (and/or the disk array enclosures of which they are part) may also be distributed across multiple, cities, countries, or continents.

As is discussed further below, the storage array 104 employs a method for the caching of data which takes into account the locations of the storage devices 114 and/or storage processors 102.

Additionally or alternatively, in some implementations, the storage processors 102 and the storage devices 114 may be located in the same geographic location, but in different buildings of the same campus (or different rooms of a large building). As is discussed further below, the storage array 104 employs a method for the caching of data which takes into account the locations of the storage devices 114 and/or storage processors 102. For example, in applications that are considered critical, even differences in distance that range in the meters or hundreds of meters could make a difference.

Figure 1B:
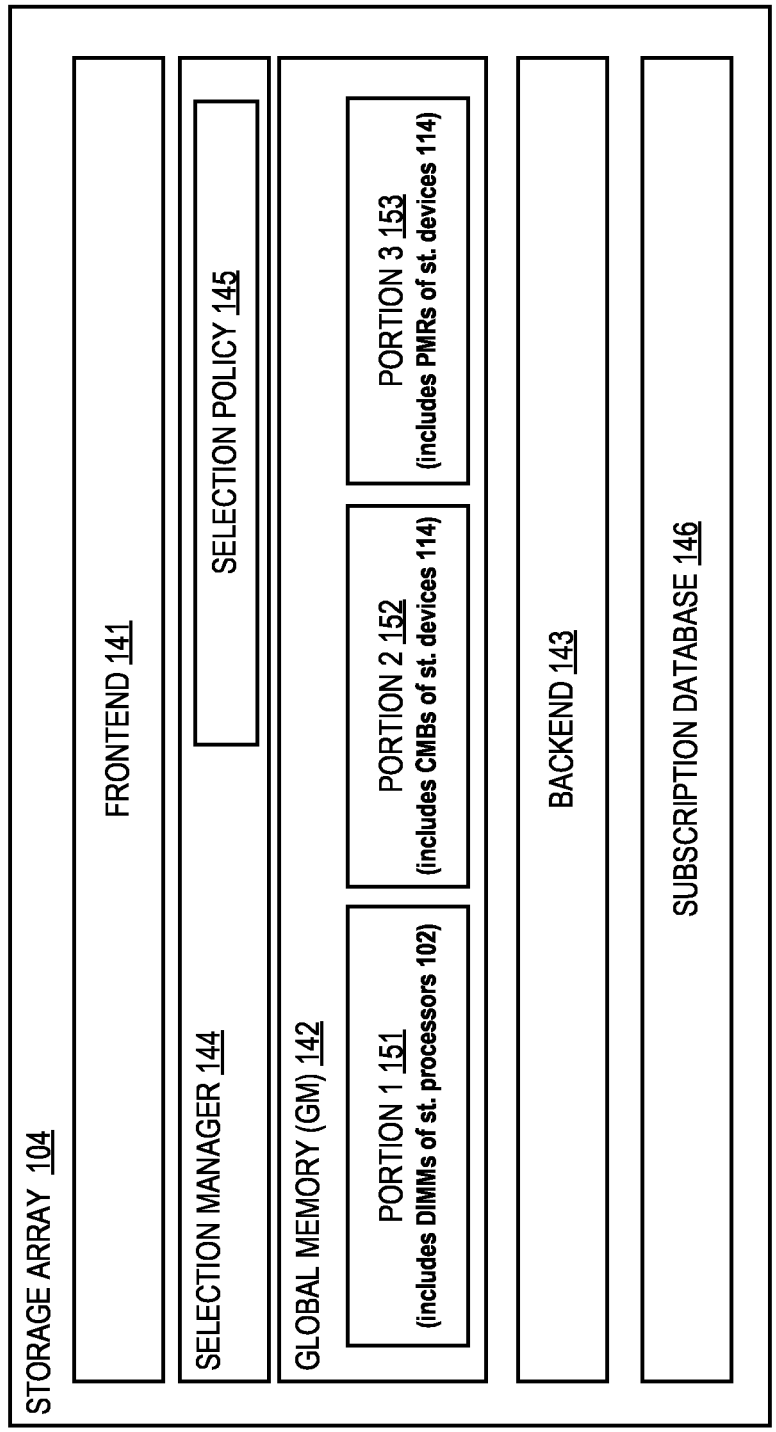
FIG. 1B is a diagram illustrating aspects of the operation of a storage array, according to aspects of the disclosure.

FIG. 1B is a diagram illustrating aspects of the operation of storage array 104, according to aspects of the disclosure. FIG. 1B illustrates that storage processors 102 may together implement a frontend 141, a backend 143, and a global memory (GM) 142. GM 142 includes a memory space that is shared among the storage processors in storage array 104, and which is used for the caching of data. GM 142 may be formed by pooling into the same address space the memories of storage processors 102.

In the present example, GM 142 may include portions 151, 152, and 153. Portion 151 may be implemented by using a plurality of Dynamic Random Access Memory (DRAM) dual in-line memory modules (DIMMs). At least some of the plurality of DIMMs may be part of different ones of storage processors 102, and they may be part of the Dynamic Random Access Memory (DRAM) of those storage processors. As another example, at least two of the DIMMs may be part of two different storage processors 102. Portion 152 may be implemented by using a plurality of CMB regions. Each of the CMB regions that constitute portion 152 may include a part (or all) of the CMB 117 of a respective one of storage devices 114. Portion 153 may be implemented by using a plurality of PMR regions. Each of the PMR regions that constitute portion 153 may include a part (or all) of the PMR 118 of a respective one of the storage devices 114.

Portions 151, 152, and 153 may have different latencies. The hardware used to form portion 151 may have the fastest access times, the hardware used to form portion 152 may have medium access times, and the hardware used to form portion 153 may have the slowest access times. In some implementations, at least one of portions 152 and 153 may be omitted from GM 142.

Figure 1C:
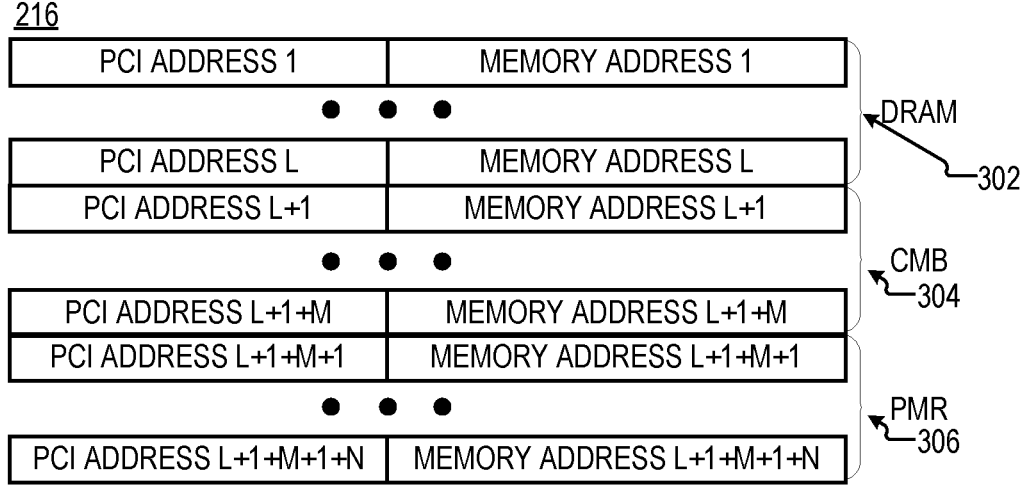
FIG. 1C is a diagram of an example of a PCI physical address map, according to aspects of the disclosure.
Figure 1D:
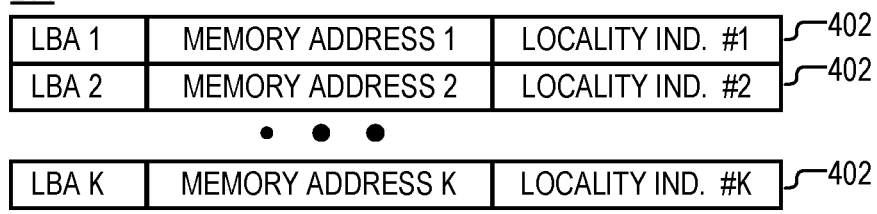
FIG. 1D is a diagram of an example of a cache metadata table, according to aspects of the disclosure.

GM 142 may be implemented by using a PCI physical address map 216 (shown in FIG. 1C) and a cache metadata table 214 (shown in FIG. 1D). PCI physical address map 216 may include portions 302-306. Portion 302 may map a first plurality of PCI addresses in a PCI address space to respective physical addresses in the DIMMs that form portion 151 of GM 142. Portion 304 may map a second plurality of PCI addresses in the PCI address space to respective physical addresses in the CMB regions that are part of portion 152 of GM 142. Portion 306 may map a third plurality of PCI addresses in the PCI address space to respective physical addresses in the PMR regions that are part of portion 153 of GM 142. FIG. 1C is provided as an example only. The PCI memory address space may be global to the entire storage array 104. In most practical applications, PCI physical address map 216 would also map addresses in the PCI memory space to physical addresses that are not used by GM 142. FIG. 1C is provided to illustrate an example of one possible mechanism that can be used to resolve the PCI addresses for the memory locations in GM 142.

Cache metadata table 214 may include a plurality of entries 402. Each entry 402 may map a different one of a plurality of logical block addresses (LBAs) to a corresponding physical memory address. In addition, each entry 402 (or at least some of the entries 402) may identify the physical location in which the hardware having the entry's corresponding memory address is located. For example, if memory address 2 (shown in FIG. 2) points to a memory device (e.g., DIMM, CMB, or PMR) that is located in Hopkinton, MA, the entry 402 which contains memory address 2 may contain an indication of this location. As another example, if memory address 1 (shown in FIG. 1D) points to a memory device (e.g., DIMM, CMB, or PMR) that is located in New York, NY, the entry 402 which contains memory address 1 may contain an indication of this location. In other words, for each physical memory address that is identified in the cache metadata table 214, cache metadata table 214 would indicate the geographical location of the physical memory device that is used to host the physical memory address. Cache metadata table 214 may be implemented as a single data structure or a plurality of data structures. Cache metadata table 214 may be accessible to any of storage processors 102 and/or copies of cache metadata table 214. It will be understood that the present disclosure is not limited to any specific method for implementing cache metadata table 214. Although not shown in FIG. 1D, in some implementations, each entry 402 may include an indication of the type of memory device that (e.g., DIMM, CMB, or PMR) that is used to implement the cache slot corresponding to that entry 402.

The terms "indication of location" or "location indicator" are used interchangeably throughout the disclosure. By way of example, an indication of location may include one or more of the name of a city or state, the name of a city district, geographic coordinates, or a postal code. As another example, an indication of location may include a building number, a floor number, or a room number. As noted above, the cache metadata table that defines GM 142 (i.e., table 214) is provided with respective indications of locations for some (or all) of the cache slots that are identified in the cache metadata table. In one particular example, this information can be used to select a cache metadata slot that is the most proximate to a particular location (such as the location of the sender of data that is desired to be stored/retrieved in the cache slot). However, in many practical applications, the physical location of the memory used to implement a cache slot may be one of many considerations that are taken into account by the cache slot selection algorithm (used by storage array 104) for the allocation of cache slots in GM 142. In this regard, the introduction of indicators of physical location of the hardware used to provide different cache slots is advantageous because it may provide system administrators with an additional tool for fine-tuning their caching algorithms. Such caching algorithms may take into account other factors, such as the type of memory used to implement the cache slot, the type of data used to implement the cache slot, age of the cache slot, and/or information that is customarily used in cache slot selection algorithms to ensure faster and more efficient data transfer.

Each of the entries 402 corresponds to a different cache slot in GM 142. Any of the cache slots may be allocated to a particular LBA by inserting an identifier of the LBA in the entry 402 that corresponds to the cache slot.

Returning to FIG. 1B, each of the frontend 141 and backend 143 may be implemented as one or more processes that are executed on the storage processors 102. The frontend 141 may be responsible for caching in GM 142 data associated with incoming write requests and the backend 143 may be responsible for destaging the data from GM 142 into the storage devices 114. In addition, the backend 143 may be responsible for loading, into the GM 142, data associated with incoming read requests, and the frontend 141 may be responsible for returning the cached data to the senders of the read requests. The frontend 141 and backend 143 may be implemented as various services (or kernel components) of the storage processors 102.

A selection manager 144 may be configured to implement preferential caching of data into the GM 142. In the example of FIG. 1B, manager 144 is depicted as a discrete block. However, it will be understood that, in some implementations, manager 144 may be integrated into frontend 141 and/or backend 143. Manager 144 may be configured to select one of the cache slots in GM 142 based on the physical location of that cache slot. The physical location of the cache slot may be identified by the location identifier that is part of the entry 402 that defines this cache slot.

The cache selection may be performed based on a selection policy 145. Selection policy 145 may be implemented by using one or more of: (i) processor-executable instructions, (ii) logical expressions, (iii) configuration settings, and/or in any other suitable manner. Selection policy 145 may specify one or more rules or conditions for selecting a cache slot. In some implementations, at least one of the rules and conditions that comprise selection policy 145 is based on the location indicators that are part of cache metadata table 214

In one example, selection policy 145 may provide that the cache slot which would receive data associated with an incoming I/O request should be selected from one or more of the cache slots (identified in cache metadata table 214) that are located within a predetermined distance from the sender of the incoming request. The location of the sender of the incoming request may be determined based on the IP address and/or another identifier of the sender that is provided with the incoming I/O request. Alternatively, selection policy 145 may provide that the cache slot which would receive data associated with an incoming I/O request should be selected from one or more of the cache slots (identified in cache metadata table 214) that are located within a predetermined distance from another location that is different from the location of the sender of the I/O request. The other location may be the location of a storage processor that is at least in part involved in executing the I/O request or any other suitable location.

Additionally or alternatively, selection policy 145 may specify one or more conditions for selecting one of the plurality of cache slots, which are located within the predetermined distance from the sender of the incoming request, as the recipient of the data. For example, selection policy 145 may specify a first condition (hereinafter "condition 1") and a second condition (hereinafter "condition 2"). In this example, selection policy 145 may provide that if condition 1 is true, data associated with an incoming I/O request should be cached in one of the cache slots that are part of portion 151. Furthermore, the selection policy 145 may further provide that if condition 1 is false and condition 2 is true, the data should be stored in a cache slot that is part of portion 152. And still furthermore, the selection policy 145 may provide that if both condition 2 and condition 3 are false, the data should be cached in a cache slot that is part of portion 153.

In some implementations, conditions 1 and 2 may be used to further narrow down the set of cache slots that satisfy the conditions requiring a cache slot to be within a predetermined distance from the sender of an I/O request or another location. In instances in which the "narrowed-down" set includes more than one cache slot, a least recently used algorithm may be used to select one of the cache slots in the "narrowed-down" set.

In some implementations, conditions 1 and 2 may be used instead of the conditions requiring a cache slot to be within a predetermined distance from the sender of an I/O request or another location (and/or any condition that is at least in part based on the location indicator of a cache slot). Alternatively, in some implementations, conditions 1 and 2 may be used when the conditions requiring a cache slot to be within a predetermined distance from the sender of an I/O request or another location are not satisfied by any of the cache slots in GM 142 (and/or any of the cache slots that are presently available for allocation). Further discussion of conditions and criteria for selecting a cache slot that is based on the type of memory that is used to host the cache slot (PMR, CMB, or DIMM) can be found in U.S. patent application Ser. No. 18/619,508, entitled METHOD AND APPARATUS FOR CACHE TIERING, which is filed currently with the present application, and which is hereby incorporated by reference in its entirety.

Additionally or alternatively, in some implementations, selection policy 145 may specify a first condition (hereinafter "condition A") and a second condition (hereinafter "condition B"). In this example, selection policy 145 may provide that if condition A is true, data associated with an incoming I/O request should be preferentially cached in a cache slot that is located within a first predetermined distance from the sender of the I/O request. Furthermore, the selection policy 145 may further provide that if condition A is false and condition B is true, the data should be preferentially stored in a cache slot that is located within a second predetermined distance from the sender of the I/O request, wherein the second predetermined distance is greater than the first predetermined distance. And still furthermore, the selection policy 145 may provide that if both condition B and condition 3 are false, the data should be stored in a cache slot that is selected at random and/or based only on one or more additional conditions for cache slot selection, which are also part of policy 145. The one or more additional rules may pay no regard to the location of the cache slot. As used herein, the phrase "data should be preferentially stored in a cache slot that is located within a predetermined distance" means that the data should be stored in a cache slot that is located within the predetermined distance, if such cache slot is available.

In one example, condition A may be true if the IP address of an incoming I/O request is associated with a "gold" subscription plan, and condition A may be false if the incoming IP address is associated with a "silver" subscription plan or a "bronze" subscription plan. The subscription plan that is associated with the IP address may be determined by using a subscription database 146. Subscription database 146 may be used in managing clients' subscription accounts for storing data in storage array 104. In one implementation, the subscription database may include a respective record for each account in storage array 104. The record may identify one or more IP addresses that are associated with the account and the level of service to which the account is entitled (e.g., gold, silver, or bronze level of service). Gold subscription plans may have the highest level of service and cost the most, bronze subscription plans have the lowest level of service and cost the list, and silver subscription plans may be in-between. It will be understood that subscription database 146 is provided as an example only and the present disclosure is not limited to any specific method for managing subscription information that can be used to identify whether an incoming I/O request is associated with a gold, silver, or bronze subscription plan.

In one example, an additional condition that is part of policy 145 may specify that the fastest available cache slot should be used to store the data associated with the incoming I/O request. It will be recalled that cache slots implemented using DIMM are faster than cache slots located in CMB, and cache slots located in CMB, and cache slots located in CMB are faster than cache slots located in PMR. In another example, an additional condition that is part of policy 145 may specify that cache slots in portion 151 (e.g., cache slots implemented using DRAM) should be used to store data associated with an incoming I/O request, unless portion 151 is 80% full. The additional condition may further specify that any of the cache slots in portion 152 (e.g., a cache slot implemented using CMB) must be used when portion 151 is 80% full and portion 152 is less than 80% full. The additional condition may further specify that a cache slot in portion 153 (e.g., a cache slot implemented using PMR) must be used when portion 152 is 80% full and portion 153 is less than 80% full. The additional condition may further specify that a cache slot in any of portions 151, 152, and 153 may be used (e.g., the portion may be selected at random), when each of portions 151, 152, and 153 is more than 80% full.

As can be readily appreciated, the application of policy 145 against the cache slots that are defined in cache metadata table 214 may yield a plurality of cache slots that satisfy the condition(s) that constitute policy 145. In such case, a least recently used algorithm may be used to select one of the plurality of cache slots that are identified as a result of the application of policy 145.

Figure 1E:
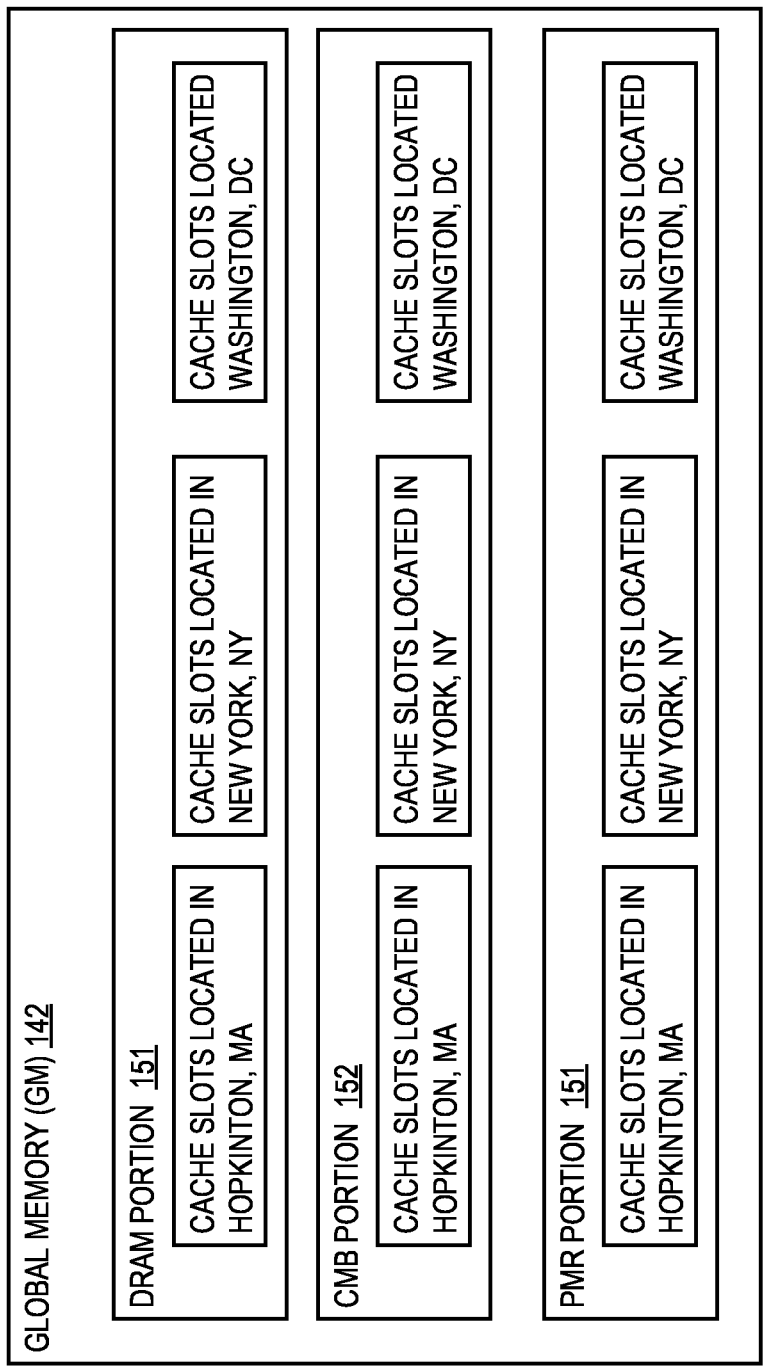
FIG. 1E is a diagram of an example of a global memory, according to aspects of the disclosure.

FIG. 1E is a schematic diagram of GM 142, according to aspects of the disclosure. Shown in FIG. 1E are portions 151, 152, and 153 of GM 142. As illustrated, each of portions 151, 152, and 153 may be comprised of different parts that are located in different geographic locations. In the example of FIG. 1E, the different parts are located in different cities—i.e., Hopkinton, MA, New York, NY, and Washington DC. Each of the parts may include memory cells in physical memory hardware that are located in the identified cities.

Figure 2A:
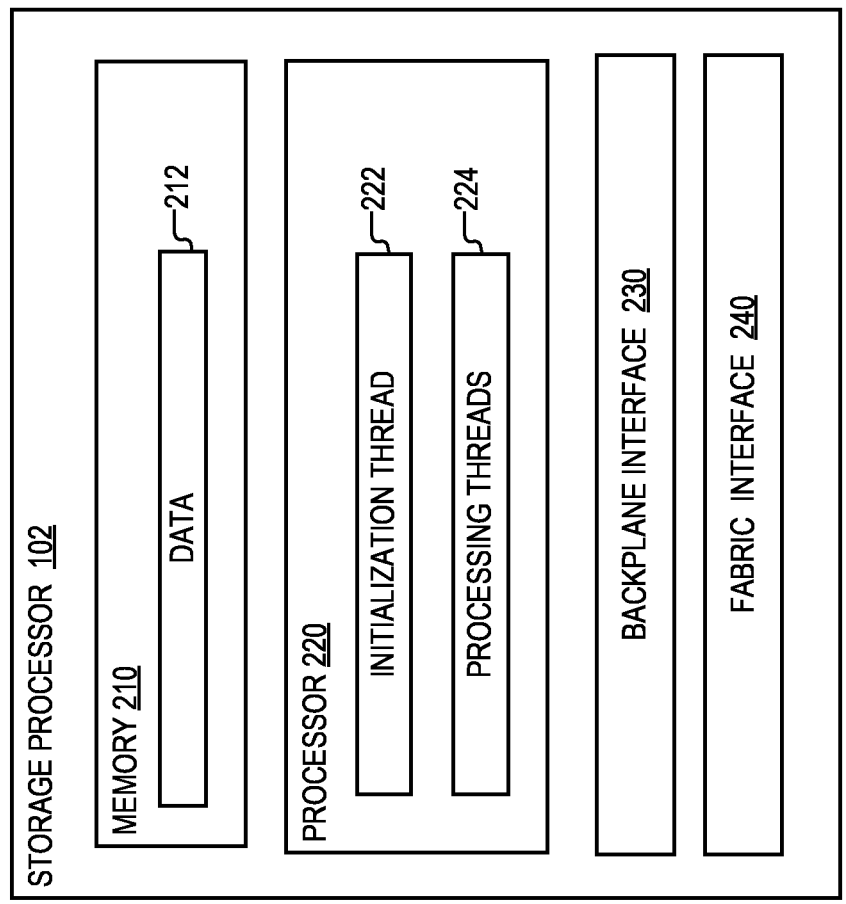
FIG. 2A is a diagram of an example of a storage processor, according to aspects of the disclosure.

FIG. 2A is a diagram of an example of a storage processor 102, according to aspects of the disclosure. As illustrated, storage processor 102 may include a memory 210, a processor 220, a backplane interface 230, and a fabric interface 240. Memory 210 may include one or more of a random-access memory (RAM), a dynamic random memory (DRAM), a flash memory, a hard drive (HD), a solid-state drive (SSD), a network-accessible storage (NAS), and/or any other suitable type of memory device. The processor 220 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The fabric interface 240 may be an InfiniBand interface. However, in alternative implementations, the interface 240 may include any suitable type of communications interface, such as one or more Ethernet adapters, one or more InfiniBand adapters, one or more Wi-Fi adapters (e.g., 802.1414 adapters), and one or more Long-Term Evolution (LTE) adapters, for example.

Memory 210 may store data 212. Data 212 may include one or more of: a copy of at least a portion of PCI physical address map 216, a copy of at least a portion of cache metadata table 214, a copy of selection policy 145, a copy of at least a portion of subscription database 146, and/or any other suitable type of information. Processor 220 may execute an initialization thread 222 and a plurality of processing threads 224. The initialization thread 222 may be configured to update and/or initialize at least a portion of PCI physical address map 216. The processing threads 224 may include threads that are used to implement and/or otherwise manage the frontend 141, the backend 143, the GM 142, the manager 144, and the subscription database 146.

Figure 2B:
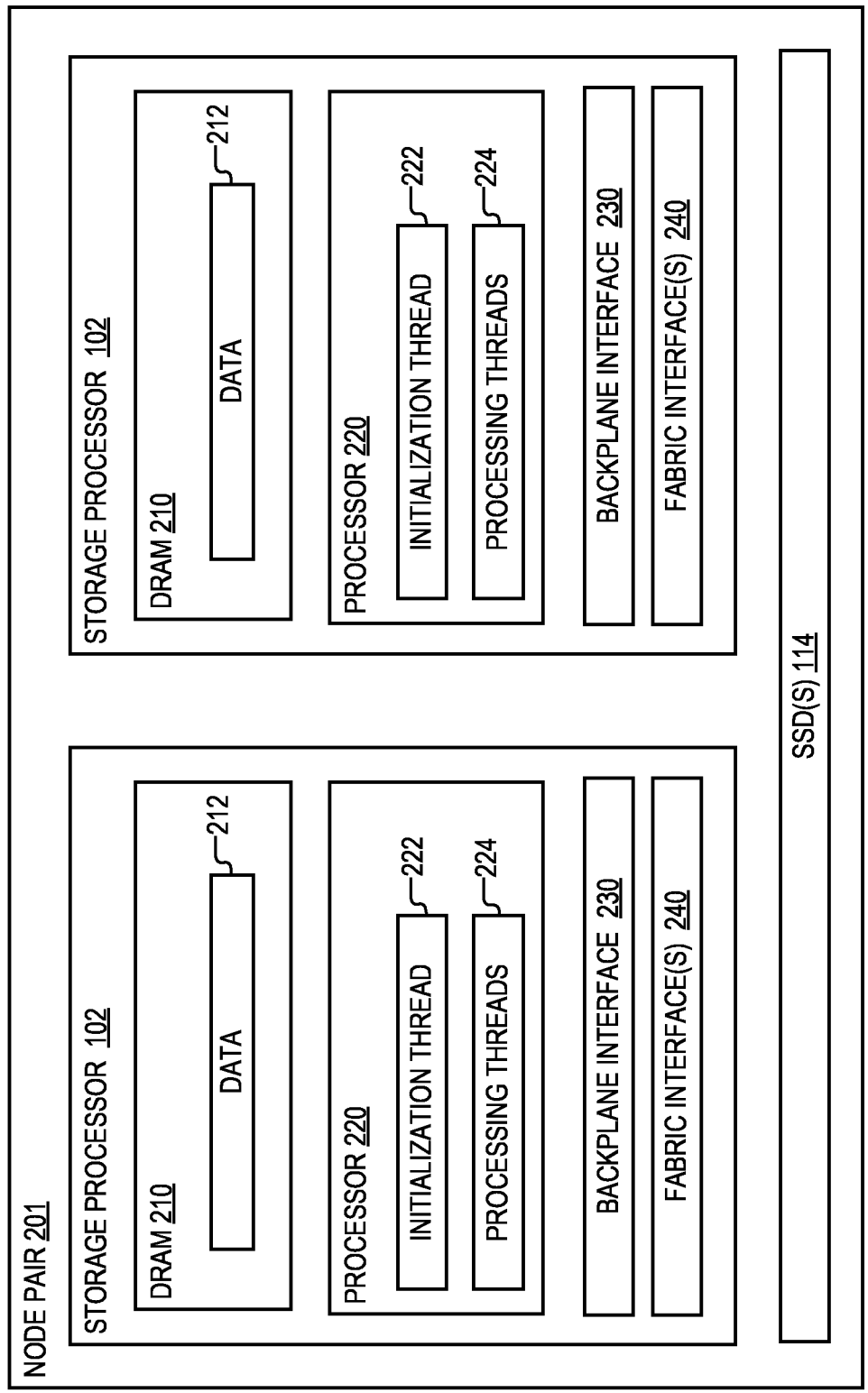
FIG. 2B is a diagram of an example of a storage processor, according to aspects of the disclosure.

FIG. 2B is a diagram of a node pair 201, according to aspects of the disclosure. The node pair 201 may be part of storage array 104. The node pair 201 may include a couple of storage processors 102 that are formed on the same motherboard, as well as one or more of the storage devices 114 (shown in FIG. 1A). The storage processors 102 and storage devices 114 that constitute the node pair 201 may be disposed in the same housing enclosure. In some implementations, the housing enclosure may be integrated into a server rack.

Figure 3:
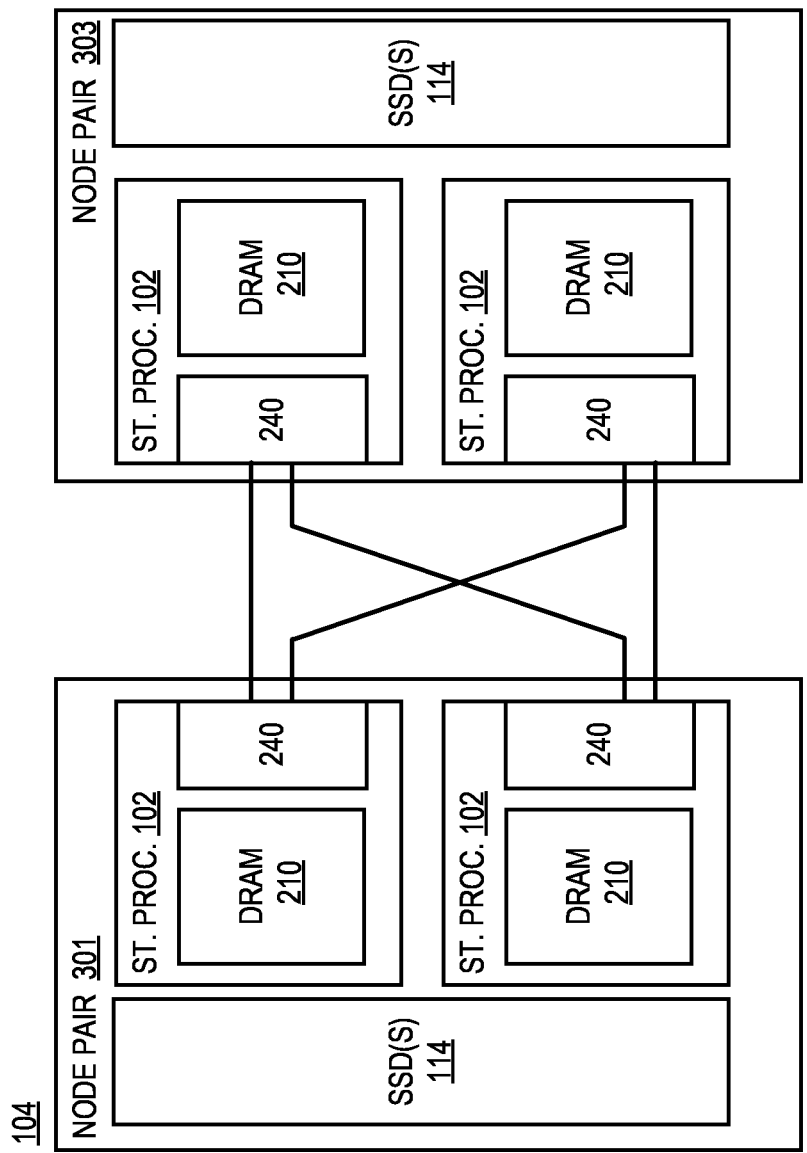
FIG. 3 is a diagram of an example of a storage array, according to aspects of the disclosure.

FIG. 3 is a diagram of an example of storage array 104, according to one implementation. In the present example, storage array 104 includes node pairs 301 and 303. Each of the node pairs 301 and 303 may be the same or similar to the node pair 201 that is discussed above with respect to FIG. 2B. Each of the node pairs 301 and 303 includes a pair of respective storage processors 102. The respective fabric interface 240 of each of the storage processors 102 may be an InfiniBand interface (or any other type of interface). The respective fabric interface 240 of each storage processor 102 may have at least two ports. The respective fabric interface 240 of each of the storage processors in storage array 104 may be coupled via a direct line to the respective fabric interface 240 of every one of the remaining storage processors 102. A direct line may be implemented by using a monolithic or optical cable or multiple spans of cable that are arranged in a path that is free of switches (or other similar hardware) that can divert traffic away from the path. A direct line may be any line that is free of packet switching capabilities. As can be readily appreciated, a packet that is placed on one end of a direct line is guaranteed to appear on the other of the line (absent a failure), irrespective of the content of the packet.

Figure 4:
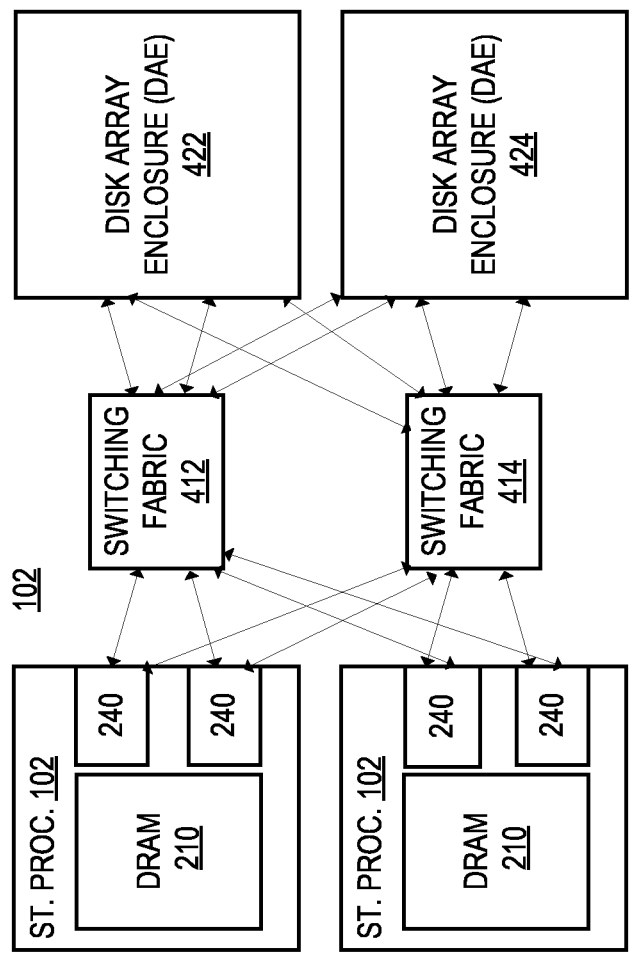
FIG. 4 is a diagram of an example of a storage array, according to aspects of the disclosure.

FIG. 4 is a diagram of FIG. 3 is a diagram of an example of storage array 104, according to another implementation. In the example of FIG. 4, storage array 104 may include two or more storage processors 102, disk array enclosures 422 and 424, and switching fabric 412 and 414. The respective fabric interface 240 of each of the storage processors 102 may be an InfiniBand interface (or any other type of interface). According to the present example, each of storage processors 102 is provided with two fabric interfaces 240. The respective fabric interfaces 240 may be InfiniBand interfaces and/or any other suitable type of interface. Each fabric interface 240, in any of storage processors 102, may be coupled to switching fabric 412 and switching fabric 414. Switching fabric 412 may be coupled to disk array enclosure 422 and disk array enclosure 424. Switching fabric 414 may be coupled to disk array enclosure 422 and disk array enclosure 424. Switching fabric 412 may include one or more first switches (e.g., InfiniBand switches, etc.). Switching fabric 414 may include one or more second switches (e.g., InfiniBand switches, etc.). Disk array enclosure 422 may include some of storage devices 114 (shown in FIG. 1A), and disk array enclosure 424 may include other ones of the storage devices 114.

Figure 5:
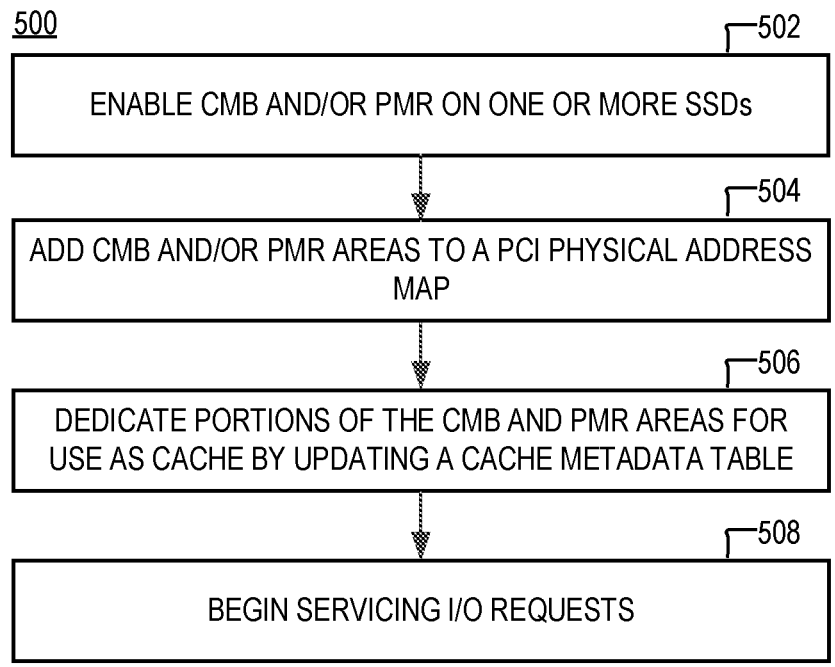
FIG. 5 is a flowchart of an example of a process, according to aspects of the disclosure.

FIG. 5 is a flowchart of an example of a process 500, according to aspects of the disclosure. According to the present example, process 500 is performed by one of the storage processors 102 in storage array 104. However, the present disclosure is not limited to any specific entity (or set of entities) performing process 500.

At step 502, the CMB and PMR of at least some of the storage devices 114 are enabled.

At step 504 the CMBs and PMRs of storage devices 114 (which are enabled at step 502) are added to the PCI physical address map 216. Adding the CMB (of any storage device 114) may include: (i) identifying a plurality of physical addresses that are available in the CMB, (ii) assigning a PCI address to each of the physical addresses, (iii) for each of the physical addresses, generating a different respective entry that maps the physical address to its assigned PCI address, and (iv) adding the generated entries to the map 216. Adding the PMR (of any storage device 114) may include: (i) identifying a plurality of physical addresses that are available in the PMR, (ii) assigning a PCI address to each of the physical addresses, (iii) for each of the physical addresses, generating a different respective entry that maps the physical address to its assigned PCI address, and (iv) adding the generated entries to the map 216.

At step 506, respective portions of the CMBs and PMRs (enabled at step 502) are added to GM 142. Adding a respective portion of any of the CMBs and PMRs to GM 142 may include: (i) identifying a plurality of physical addresses that constitute the portion, (ii) for each of the physical addresses generating a respective entry 402 that includes an identifier of the physical address and an identifier of the physical location of the memory hardware that is assigned the physical address, and (iii) adding each of the generated entries 402 to the cache metadata table 214. Furthermore, at step 506, one or more regions from the respective DRAM of any of storage processors 102 may be added to GM 142. Any of the DRAM regions may be added by: (i) identifying a plurality of physical addresses that constitute the region, (ii) for each of the physical addresses generating a respective entry 402 that includes an identifier of the physical address and an identifier of the type of memory of which the physical address is part (i.e., DRAM), and (iii) adding each of the generated entries 402 to the cache metadata table 214. In some implementations, the indication of location for any physical address may be determined based on a database (not shown) which maps the serial number (or another identifier) of memory hardware to corresponding location.

At step 508, the storage system begins servicing I/O requests. The I/O requests may include read requests, write requests, and/or any other suitable type of input-output (I/O) output request.

Figure 6:
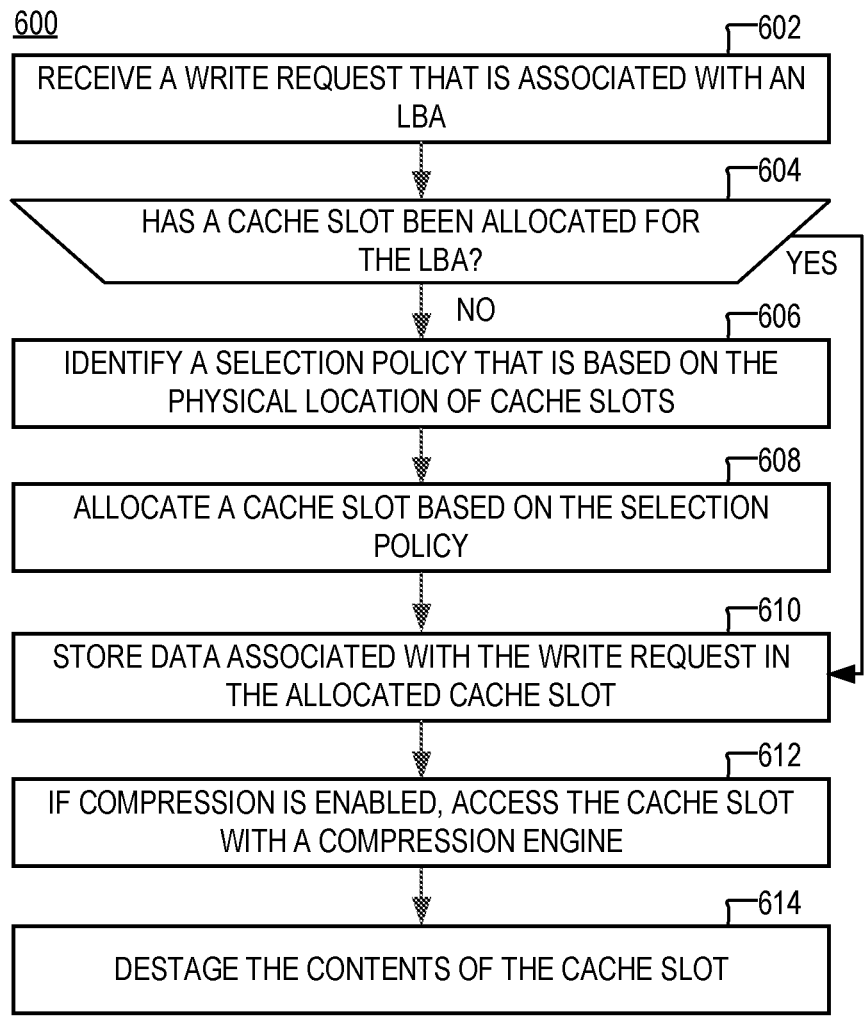
FIG. 6 is a flowchart of an example of a process, according to aspects of the disclosure.

FIG. 6 is a flowchart of an example of a process 600, according to aspects of the disclosure. According to the present example, process 600 is performed by one of the storage processors 102 in storage array 104. However, the present disclosure is not limited to any specific entity (or set of entities) performing process 600.

At step 602, storage processor 102 receives a write request that is associated with an LBA. The write requests may be received from one of the host devices 130.

At step 604, storage processor 102 determines if a cache slot has been allocated, in GM 142, to the LBA that is associated with the write request. If a cache slot has already been allocated, process 600 proceeds to step 610. Otherwise, process 600 proceeds to step 606.

At step 606, storage processor 102 identifies a policy for the selection of a cache slot. The identified selection policy may be any suitable type of policy for the selection of a cache slot that is least in part based on a location indicator for the cache slot that is provided in the cache metadata table where the cache slot is defined (e.g., cache metadata table 214). In some implementations, the identified policy may be the same or similar to the selection policy 145 that is discussed above with respect to FIG. 1B.

At step 608, storage processor 102 allocates a cache slot based on the selection policy (identified at step 606). In some implementations, the storage processor may use the information that is stored in the cache metadata table 214 to identify one or more cache slots (or entries 402) that satisfy the conditions or criteria that are specified by the selection policy. Afterwards, when more than one cache slot is identified, storage processor 102 may select the least recently used one among the identified cache slots (or entries 402). And finally, storage processor 102 may insert the LBA into the entry 402, thus completing the allocation of the cache slot to the LBA.

At step 610, data associated with the write request is stored in the allocated cache slot. The data may be stored by executing a direct memory access (DMA) write to the cache slot. The DMA write can be executed by (i) using the cache metadata table 214 to identify the physical memory address (or other memory address) that is associated with the cache slot, (ii) using the PCI physical address map 216 to identify the PCI address that is associated with the physical memory address, and (iii) issuing a DMA write to the identified PCI address. In some implementations, the DMA write may be completed by using an NVME or NVMF transaction. The synchronization of memory may be performed by the fabric interface 240 of the storage processor 102 that is executing process 600. In some implementations, the fabric interface may be an NVIDIA CONNECTX-7™ InfiniBand interface.

At step 612, the data is compressed by using a compression engine. To compress the data, the compression engine may retrieve the data from the cache slot, compress the retrieved data, and overwrite the cache slot with the compressed data. Step 612 may be executed only if compression is enabled.

At step 614, the compressed data is destaged. Destaging the compressed data may include copying the compressed from the cache slot to one or more of the storage media 116 of the storage devices 114.

Figure 7:
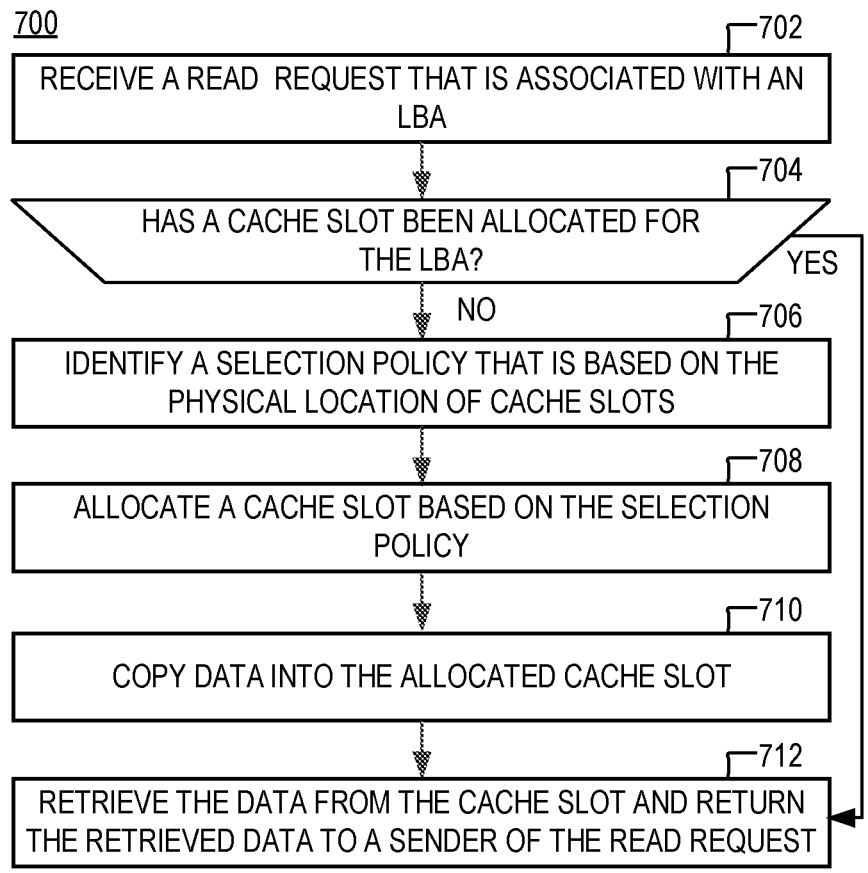
FIG. 7 is a flowchart of an example of a process, according to aspects of the disclosure.

FIG. 7 is a flowchart of an example of a process 700, according to aspects of the disclosure. According to the present example, process 700 is performed by one of the storage processors 102 in storage array 104. However, the present disclosure is not limited to any specific entity performing process 700.

At step 702, storage processor 102 receives a read request that is associated with an LBA. The read requests may be received from one of the host devices 130.

At step 704, storage processor 102 determines if a cache slot has been allocated, in GM 142, for the LBA that is associated with the read request. If a cache slot has already been allocated, process 700 proceeds to step 710. Otherwise, process 700 proceeds to step 706.

At step 706, storage processor 102 identifies a policy for the selection of a cache slot. The identified selection policy may be any suitable type of policy for the selection of a cache slot that is least in part based on a location indicator for the cache slot that is provided in the cache metadata table where the cache slot is defined (e.g., cache metadata table 214). In some implementations, the identified policy may be the same or similar to the selection policy 145 that is discussed above with respect to FIG. 1B.

At step 708, storage processor 102 allocates a cache slot based on the selection policy (identified at step 706). In some implementations, the storage processor may use the information that is stored in the cache metadata table 214 to identify one or more cache slots that satisfy the conditions or criteria that are specified by the selection policy. Afterwards, when more than one cache slot is identified, storage processor 102 may select the least recently used one among the identified entries 402. And finally, storage processor 102 may insert the LBA into the entry 402, thus completing the allocation of the cache slot to the LBA.

At step 710, data associated with the read request is stored in the allocated cache slot. The data may be stored by executing a direct memory access (DMA) write to the cache slot. The DMA write can be executed by (i) using the cache metadata table 214 to identify the physical memory address (or other memory address) that is associated with the cache slot, (ii) using the PCI physical address map 216 to identify the PCI address that is associated with the physical memory address, and (iii) issuing a DMA write to the identified PCI address. In some implementations, the DMA write may be completed by using an NVME or NVMF transaction. The synchronization of memory may be performed by the fabric interface 240 of the storage processor 102 that is executing process 700. In some implementations, the fabric interface may be an NVIDIA CONNECTX-7™ InfiniBand interface.

At step 712, the data is retrieved from the cache slot and returned to a sender of the read request.

FIGS. 1-7 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-7 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. In the examples provided throughout the disclosure, storage devices 114 are SSDs. However, alternative implementations are possible in which any of storage devices 114 is another type of storage device such as a hard disk for example. It will be understood that the present disclosure is not limited to any specific implementation of storage devices 114.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (3/14)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage processor, comprising:
generating or updating a cache metadata table that identifies a plurality of cache slots, for each of the plurality of cache slots, the cache metadata table including a different respective location identifier that indicates a location for that cache slot;
receiving an I/O request that is associated with a logical block address;
allocating a given one of the plurality of cache slots to the logical block address based on the respective location identifier that corresponds to the given cache slot; and
executing the I/O request by using the given cache slot, wherein using the given cache slot includes identifying a memory address that is associated with the cache slot and executing at least one direct memory access (DMA) command based on the memory address,
wherein the cache metadata table includes a global memory cache table for a storage system of which the storage processor is part, and at least some of the plurality of cache slots are resident in random access memory modules of other storage processors that are part of the storage system,
wherein identified memory address is a global memory address belonging to a memory namespace that encompasses multiple storage processors in the storage system,
wherein allocating the given cache slot includes obtaining an identifier of a host device that is associated with the I/O request, and retrieving a location-based policy that corresponds to the host device, and
wherein the given cache slot is allocated based on both the location-based policy and the respective location identifier of the given cache slot.

2. The method of claim 1, wherein allocating the given cache slot based on the respective location identifier of the given cache slot m includes allocating one of the plurality of slots that is situated within a predetermined geographic distance from the storage processor.

3. The method of claim 1, wherein at least one of the plurality of cache slots is resident in a storage controller memory buffer of a solid state drive (SSD).

4. The method of claim 1, wherein at least one of the plurality of cache slots is part of a persistent memory region of an SSD.

5. The method of claim 1, wherein:
the given cache slot is resident in a volatile memory of an SSD, and
executing the DMA command includes identifying a parallel computing interface (PCI) address for a portion of the volatile memory of the SSD and using the identified PCI address to execute the DMA command, the PCI address being identified based on the memory address.

6. The method of claim 5, wherein the SSD is one of:
an SSD that is situated in a same enclosure as the storage processor and plugged into an M.2 slot that is provided in a motherboard of the storage processor;
an SSD that is external to the storage processor and coupled to the storage processor via an InfiniBand adapter of the storage processor; and
an SSD that is external to the storage processor and coupled to the storage processor via a backplane of a server enclosure in which the storage processor is situated.

7. A computing device, comprising:
a memory; and
at least one processor that is operatively coupled to the memory, the at least one processor being configured to perform the operations of:
generating or updating a cache metadata table that identifies a plurality of cache slots, for each of the plurality of cache slots, the cache metadata table including a different respective location identifier that indicates a location for that cache slot;
receiving an I/O request that is associated with a logical block address;
allocating a given one of the plurality of cache slots to the logical block address based on the respective location identifier that corresponds to the given cache slot; and
executing the I/O request by using the given cache slot, wherein using the given cache slot includes identifying a memory address that is associated with the cache slot and executing at least one direct memory access (DMA) command based on the memory address,
wherein the cache metadata table includes a global memory cache table for a storage system of which the computing device is part, and at least some of the plurality of cache slots are resident in random access memory modules of other computing devices that are part of the storage system,
wherein identified memory address is a global memory address belonging to a memory namespace that encompasses multiple computing devices in the storage system,
wherein allocating the given cache slot includes obtaining an identifier of a host device that is associated with the I/O request, and retrieving a location-based policy that corresponds to the host device, and
wherein the given cache slot is allocated based on both the location-based policy and the respective location identifier of the given cache slot.

8. The computing device of claim 7, wherein allocating the given cache slot based on the respective location identifier of the given cache slot and the location-based policy includes allocating one of the plurality of slots that is situated within a predetermined geographic distance from the computing device.

9. The computing device of claim 7, wherein at least one of the plurality of cache slots is resident in a storage controller memory buffer of a solid state drive (SSD).

10. The computing device of claim 7, wherein at least one of the plurality of cache slots is part of a persistent memory region of an SSD.

11. The computing device of claim 7, wherein:
the given cache slot is resident in a volatile memory of an SSD, and
executing the DMA command includes identifying a parallel computing interface (PCI) address for a portion of the volatile memory of the SSD and using the identified PCI address to execute the DMA command, the PCI address being identified based on the memory address.

12. The computing device of claim 11, wherein the SSD is one of:
an SSD that is situated in a same enclosure as the computing device and plugged into an M.2 slot that is provided in a motherboard of the computing device;
an SSD that is external to the computing device and coupled to the computing device via an InfiniBand adapter of the computing device; and
an SSD that is external to the computing device and coupled to the computing device via a backplane of a server enclosure in which the computing device is situated.

13. A non-transitory computer-readable medium storing one or more processor-executable instructions, which, when executed by at least one processor of a computing device, causes the computing device to perform the operations of:
generating or updating a cache metadata table that identifies a plurality of cache slots, for each of the plurality of cache slots, the cache metadata table including a different respective location identifier that indicates a location for that cache slot;
receiving an I/O request that is associated with a logical block address;
allocating a given one of the plurality of cache slots to the logical block address based on the respective location identifier that corresponds to the given cache slot; and
executing the I/O request by using the given cache slot, wherein using the given cache slot includes identifying a memory address that is associated with the cache slot and executing at least one direct memory access (DMA) command based on the memory address,
wherein the cache metadata table includes a global memory cache table for a storage system of which the computing device is part, and at least some of the plurality of cache slots are resident in random access memory modules of other computing devices that are part of the storage system,
wherein identified memory address is a global memory address belonging to a memory namespace that encompasses multiple computing devices in the storage system,
wherein allocating the given cache slot includes obtaining an identifier of a host device that is associated with the I/O request, and retrieving a location-based policy that corresponds to the host device, and
wherein the given cache slot is allocated based on both the location-based policy and the respective location identifier of the given cache slot.

14. The non-transitory computer-readable medium of claim 13, wherein allocating the given cache slot based on the respective location identifier of the given cache slot and the location-based policy includes allocating one of the plurality of slots that is situated within a predetermined geographic distance from the computing device.

15. The non-transitory computer-readable medium of claim 13, wherein at least one of the plurality of cache slots is resident in a storage controller memory buffer of a solid state drive (SSD).

16. The non-transitory computer-readable medium of claim 13, wherein at least one of the plurality of cache slots is part of a persistent memory region of an SSD.

17. The non-transitory computer-readable medium of claim 13, wherein:
- the given cache slot is resident in a volatile memory of an SSD, and
- executing the DMA command includes identifying a parallel computing interface (PCI) address for a portion of the volatile memory of the SSD and using the identified PCI address to execute the DMA command, the PCI address being identified based on the memory address.

* * * * *